Inventors
Wayne A. Barden
Charles C. Snyder
Glenn S. Thompson
By Hamilton Jones
Attorney Oct. 20, 1959 W. A. BARDEN ET AL 2,909,749
ELECTRICAL CONTROL INSTRUMENTALITY
Filed Oct. 17, 1957 5 Sheets-Sheet 3

Inventors
Wayne A. Barden
Charles C. Snyder
Glenn S. Thompson
By Seamilton Jones
Attorney

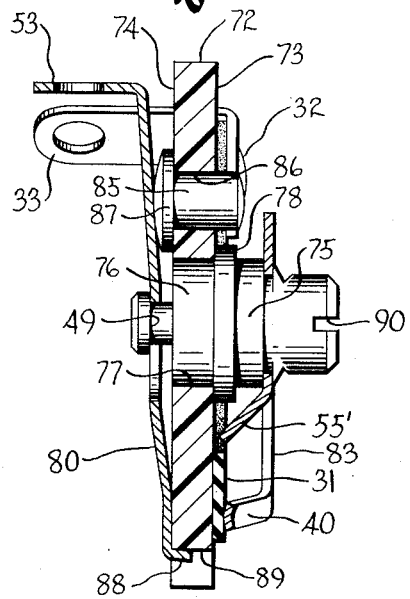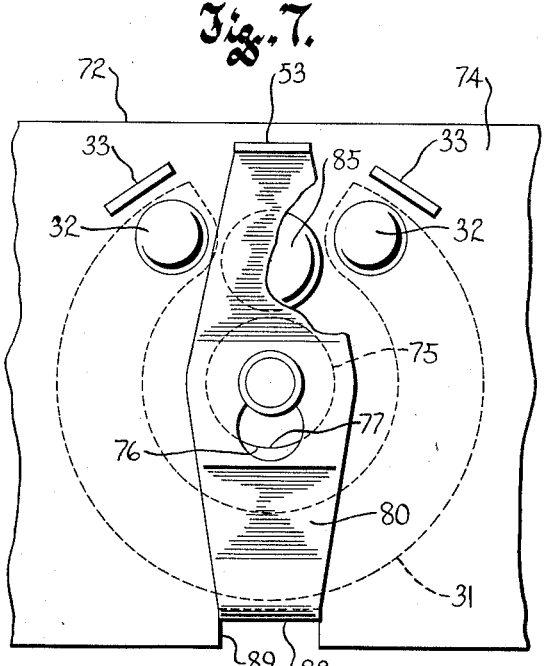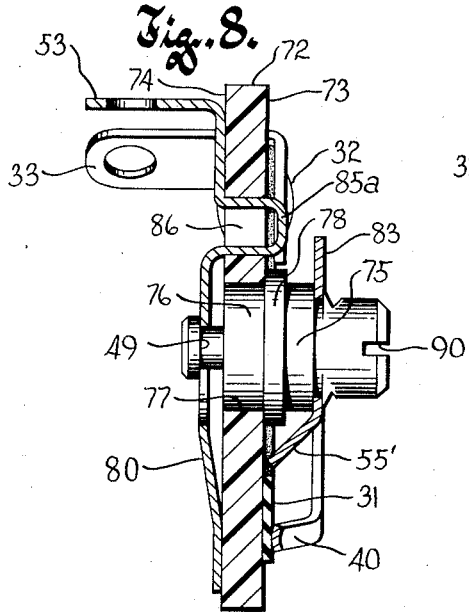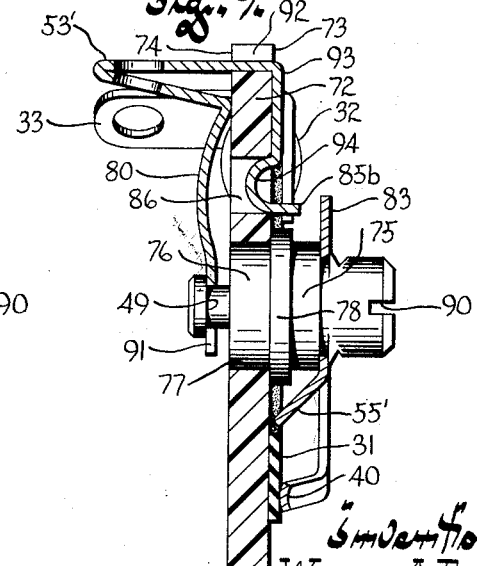

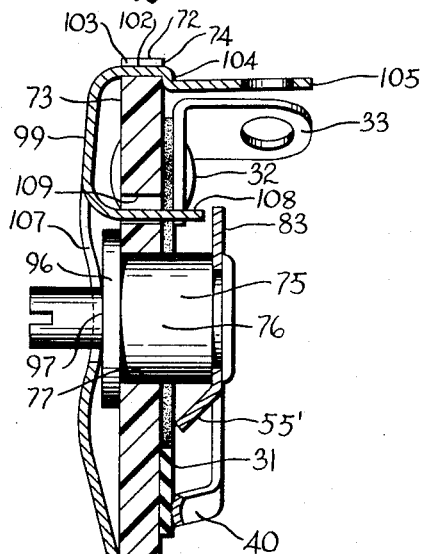
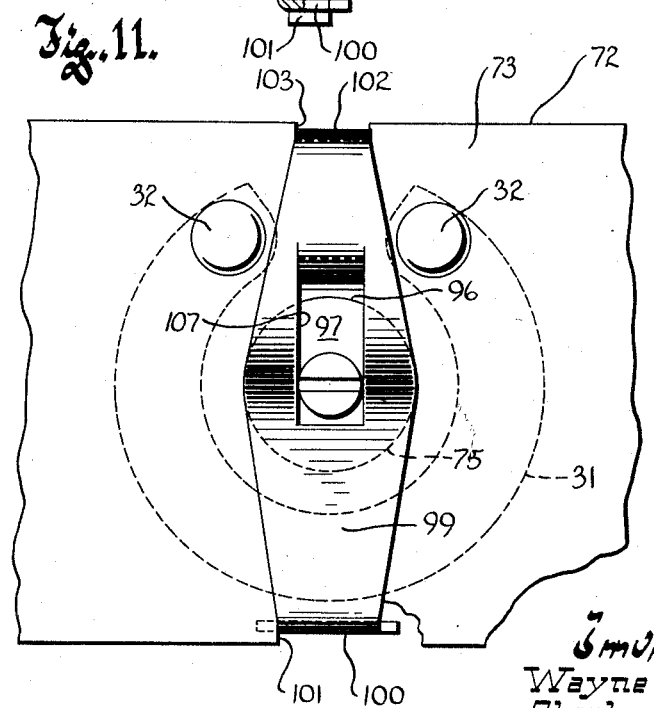

United States Patent Office 2,909,749
Patented Oct. 20, 1959

2,909,749

ELECTRICAL CONTROL INSTRUMENTALITY

Wayne A. Barden, Elkhart, and Charles C. Snyder, Osceola, Ind., and Glenn S. Thompson, Milwaukee, Wis., assignors to Chicago Telephone Supply Corporation, Elkhart, Ind., a corporation of Indiana Application October 17, 1957, Serial No. 690,697

5 Claims. (Cl. 338—163)

This invention relates to electrical control instrumentalities and has more particular reference to variable resistors and electric switch-variable resistor combinations.

Most conventional variable resistors comprise a housing having a wall providing an insulating base with a stator assembly mounted thereon, and in which a rotor assembly is journaled for cooperation with the elements of the stator assembly. The stator assembly includes a resistance element, usually a flat arcuate strip on one face of the base, concentric to the rotor, with two of the terminals of the variable resistor secured to its ends, and a smaller diameter collector ring fixed on the base in spaced concentric relation to the resistance element and encircled thereby. The third terminal of the variable resistor is secured to the collector ring, and all three terminals are usually closely grouped together at an accessible part of the instrumentality.

The rotor assembly ordinarily includes a rotatable operating shaft, a one-piece metal contactor carried by the shaft and having an outer finger or fingers arranged to bear under pressure against the exposed face of the resistance element to traverse the same upon rotation of the operating shaft, and an inner finger arranged to bear under pressure upon the collector ring. The contactor is customarily secured to a carrier disc of insulating material and the carrier is fixed to the shaft to rotate therewith.

In the construction described, the resistance element had to be large enough in diameter to enable the collector ring to be located concentrically between the resistance element and the shaft, in radially spaced relation thereto. Accordingly there were limits to the degree of compactness that could be achieved in the variable resistor described. A more serious disadvantage of this type of variable resistor, however, resided in the inflexibility of its design. The cooperating rotor and stator parts always bore the same positional relationship to one another and each had only one function.

With the foregoing in mind, the purposes of this invention are to provide a variable resistor of the general character described but which is so constructed as to enable its size to be reduced to a dimension smaller than the diameter of an ordinary ten cent coin; to enable extensive reorientation of the stator and rotor components for the achievement of an unprecedented degree of design flexibility without the need for additional piece parts in the resistor assembly; and to achieve greater simplicity through the utilization of rotor and stator parts that serve more than one function.

More specifically, it is an object of this invention to provide a variable resistor of the character described wherein the collector component of the stator may be located remote from the resistance element, whereby the latter can be made to more closely encircle the operating shaft than was heretofore possible in resistors having concentrically mounted resistance elements and collector rings.

Still another object of this invention resides in the provision of a variable resistor wherein the collector may be mounted on a supporting surface other than that carrying the resistance element, such as an exterior surface of a resistor housing, and so interengaged with a collector contact formed directly on the operating shaft as to cooperate with said collector contact in maintaining the shaft operatively assembled with the instrumentality.

In this connection it is still another object of this invention to provide a variable resistor which includes a housing having spaced front and rear walls respectively formed on interfitting but axially separable front and rear housing sections, and wherein the collector cooperates with abutments on the front and rear ends of the operating shaft to yieldingly hold the housing sections against axial separation and to maintain the operating shaft properly assembled with the housing.

Another object of the invention resides in the provision of a variable resistor construction which is admirably suited for use as a preset control capable of being mounted on a single panel or disc of insulating material having the resistance element and collector mounted on opposite sides thereof.

A further object of this invention resides in the provision of a variable resistor of the character described wherein a single spring strip serves as a collector located remote from the resistance means of the resistor, a shaft retainer, and has an integral rotation stop thereon for the shaft.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate several complete examples of the physical embodiments of the invention constructed according to the best modes so far devised for the practical application of the principles thereof, and in which:

Figure 6 is a longitudinal sectional view illustrating how the principles of this invention can be advantageously embodied in a variable resistor of the preset type;

Figure 7 is a rear elevational view of the variable resistor shown in Figure 6;

Figure 8 is a sectional view similar to Figure 6 but illustrating a slightly different embodiment of the invention;

Figure 9 is a sectional view similar to Figure 8 and illustrating another form of the invention;

Figure 10 is a sectional view similar to Figure 9 showing a further embodiment of the invention; and Figure 11 is a front elevational view of the variable resistor shown in Figure 10.

Figure 1:
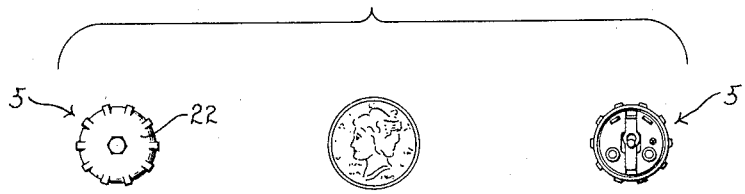
Figure 1 is a full scale group view respectively illustrating front and rear elevations of a variable resistor embodying the principles of this invention, and comparing the size thereof to that of an ordinary ten cent coin.

Referring now more particularly to the accompanying drawings, in which like reference characters have been applied to like parts throughout the several views, the numeral 5 in that form of the invention illustrated in Figures 1 through 5, designates generally a variable resistor housing comprising front and rear cup shaped housing sections 6 and 7, respectively, having their open ends abutting one another. The housing sections are axially separable, and have cylindrical side wall portions 8 projecting toward one another and interlocking at their rims, as at 9, to hold the housing sections coaxial.

The bottoms of the cup shaped housing sections provide spaced front and rear walls 10 and 11, respectively, of insulating material having aligned holes 12 and 13, respectively, which provide bearings for an operating shaft 14 of metal having good electrical conducting characteristics. An intermediate portion 15 of the operating shaft is journaled in the bearing 12 and has the largest diameter, and its opposite end portions protrude through the bearing holes in the front and rear walls of the housing for a purpose now about to be described.

Immediately ahead of the forwardly facing surface of the front wall 10, the operating shaft is provided with a circumferential groove 18 in which a C-washer 19 is engaged to provide an abutment on the shaft cooperable with the front wall to limit rearward endwise motion of the shaft with respect to the housing. The forward extremity 20 of the operating shaft, ahead of the groove 18, is also slabbed off to provide diametrically opposite flats 21 on its exterior and carries a cup-like actuating knob 22. The cylindrical skirt 23 of the knob is telescoped over the housing, and its bottom wall 24 is flatwise adjacent to the front of the housing. A rotation transmitting connection between the knob and the shaft is provided by the engagement of the non-circular front end portion of the shaft in a correspondingly shaped non-circular well 25 in the bottom 24 of the knob, and the knob is held against axial separation from the shaft by a screw 28 passing through the bottom wall of the knob and threaded into a hole 29 in the operating shaft.

A resistance element 31 is mounted on the inner face of the front wall 10 of the housing encircling the operating shaft in spaced concentric relation thereto. While it has been shown as a flat arcuate strip having its opposite ends near one another and secured to the front wall or base 10 of the housing by rivets 32, the resistance element may be sprayed, painted or otherwise directly applied onto its insulating supporting wall, or it may be formed in any other well known manner. The rivets 32 also serve to secure L-shaped terminal connectors 33 to the end portions of the resistance element with the short legs of the terminal connectors overlying the exposed rear face of the element and the longer legs thereof projecting rearwardly through the interior of the housing and beyond the rear wall 11 thereof, passing through suitable slits 34 in the rear wall.

Cooperating with the resistance element 31 is a contactor 36 of electrically conductive material, preferably stamped from spring brass. The contactor 36 has a non-circular central hole of a shape to nonrotatably receive a slightly reduced non-circular portion 37 on the operating shaft directly behind its large diameter intermediate portion 15. The contactor is fixed on the shaft against axial displacement by swedging portions 38 of the shaft over the rear face of the contactor, so that the latter is clamped against the rear of the large diameter intermediate portion 15 of the shaft.

Inasmuch as the shaft is formed of metal of good electrical conducting characteristics, it will be appreciated that the contactor is at all times in electrically conductive relation to the shaft, and that as it rotates with the shaft, contact fingers 40 formed on the contactor and resiliently engaged against the exposed rear face of the resistance element will be caused to traverse the latter.

Figure 2:
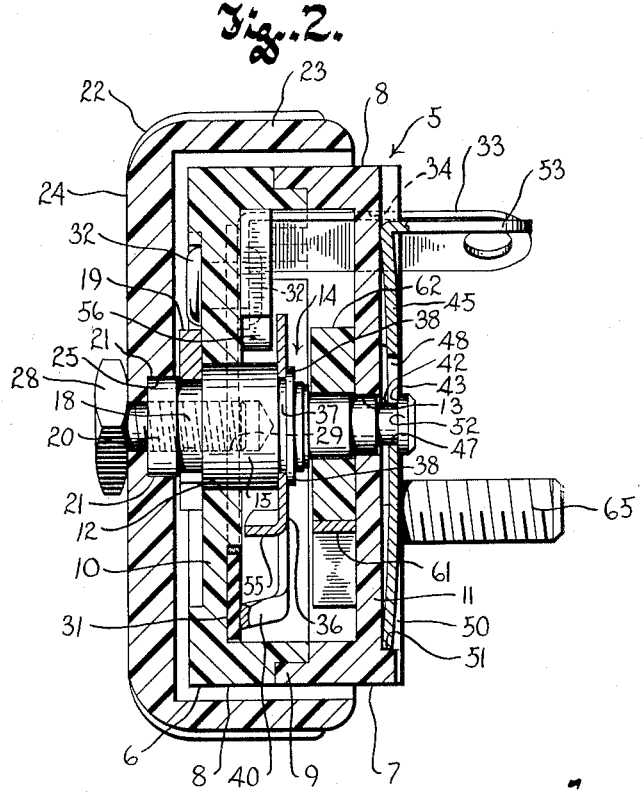
Figure 2 is an enlarged longitudinal sectional view of the variable resistor shown in Figure 1.
Figure 3:
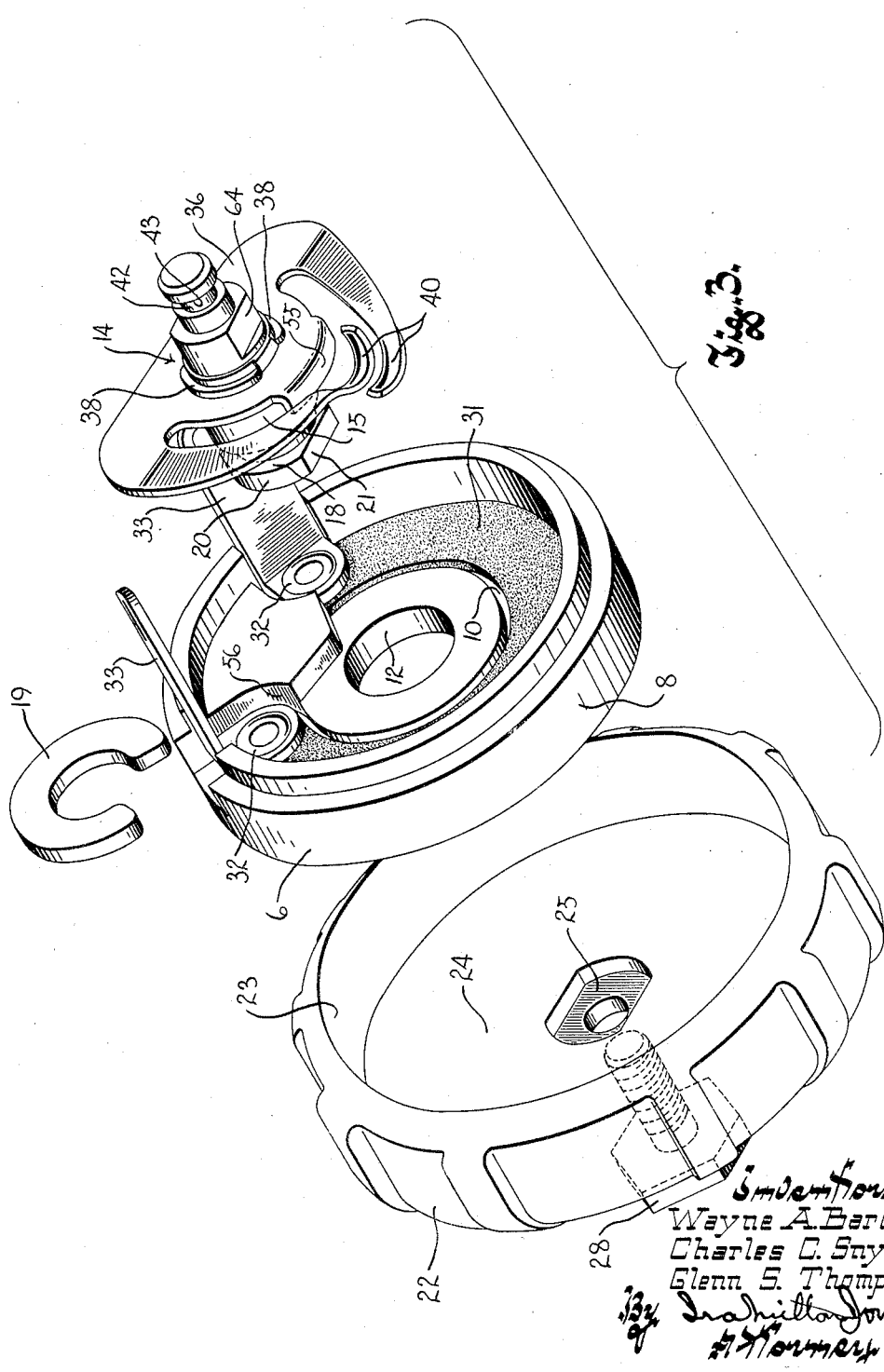
Figure 3 is a group perspective view illustrating front portions of the variable resistor in disassembled relation.

As shown best in Figure 2, the resilient fingers 40 are formed as part of the contactor and are bent forwardly from the plane thereof toward engagement with the exposed rear face of the resistance element. The C-washer or abutment 19 on the protruding front end portion of the operating shaft is so located thereon that it holds the spring fingers flexed and engaged under spring force with the resistance element, so as to assure the proper degree of contact pressure therebetween.

The protruding rear end portion of the operating shaft also has a circumferential groove 42 therein which defines an annular forwardly facing abutment 43 on the extremity of the shaft spaced a short distance behind the back face of the rear wall 11 of the housing. Confined between the abutment 43 and the rear wall 11 of the housing is a spring strip 45 which extends transversely across the rear of the housing and has its central portion bowed rearwardly to exert spring force upon the abutment 43 in a direction to resist forward axial motion of the shaft relative to the housing. The spring strip thus tends to move the operating shaft rearwardly and maintain the C-washer or abutment 19 on the front end of the shaft firmly engaged with the front wall 10 of the housing, and accordingly, the spring strip serves as a retainer for the shaft.

With the construction described it will be apparent that the spring strip or retainer 45 also cooperates with the front and rear abutments on the shaft and with the housing sections to hold the latter firmly pressed together and against axial separation, and it is one of the features of this invention that the spring strip is formed with a keyhole opening in its center to facilitate its application to and removal from the rear of the housing.

Figure 5:
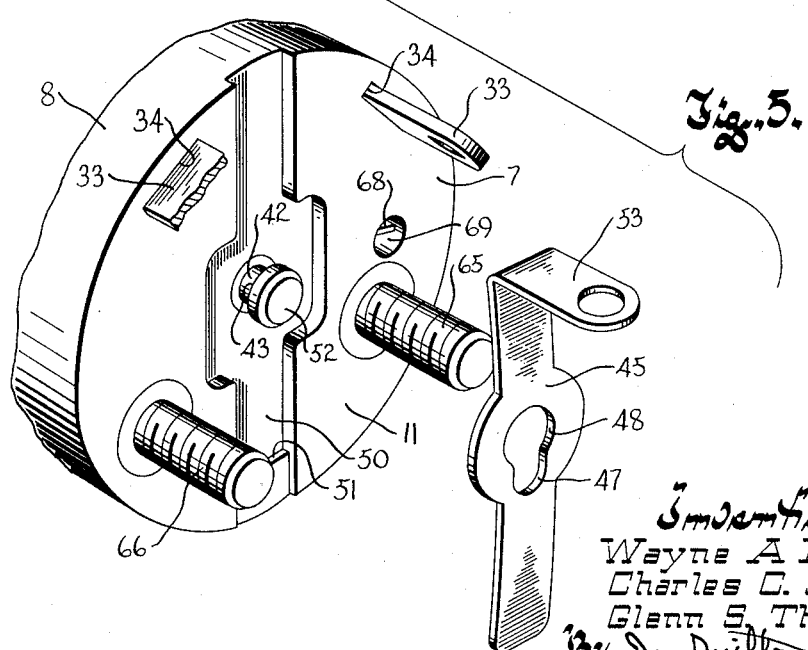
Figure 5 is a group perspective view of the rear of the variable resistor housing and showing the collector removed therefrom.

Referring to Figures 2 and 5, it will be seen that in the assembled position of the retainer the smaller portion 47 of its keyhole is coaxial with the operating shaft and has the neck-like rear end portion of the shaft defined by the groove 42 received therein, while the larger part 48 of the keyhole opening is disposed eccentrically of the shaft. To remove the retainer from the housing, it is only necessary to slide it downwardly as seen in Figure 2 to bring the larger part 48 of its keyhole opening into registery with the abutment 43 on the rear of the shaft, so that the abutment 43 can be passed therethrough.

The spring strip or retainer is held against accidental endwise motion toward its releasing position and against rotary movement relative to the housing by the engagement of edge portions thereof in a substantially shallow well or indentation 50 in the back face of the rear wall of the housing. The indentation 50, of course, has a shape generally corresponding to the outline of the spring strip, and it should be noted that while one transverse end of the indentation opens radially to one side of the housing, namely the top as shown in Figures 2 and 5, its opposite end is closed so as to provide an abutment 51 facing the axis of rotation of the shaft behind which the end of the spring strip adjacent to the small part 47 of its keyhole opening snaps during assembly to prevent accidental movement of the spring strip out of its operative shaft retaining position.

It is also an important feature of this invention that the spring strip 45 also serves as the collector for the variable resistance component of the potentiometer, while the rear end portion of the shaft provides a collector contact 52 having the abutment 43 as its contact surface. For this purpose the spring strip is preferably made of a metal having good electrical conducting characteristics, and the end of the spring adjacent to the large part of its keyhole opening is bent rearwardly to provide a third terminal connector 53 for the variable resistor, located medially between the terminal connectors 33. The marginal edge portions of the smaller part 47 of the keyhole opening in the collector engage the forwardly facing abutment or contact surface 43 on the end of the operating shaft under spring force to at all times maintain good electrical conductivity between the contactor 36 and the collector through the operating shaft.

Rotation stops for the operating shaft may be provided in any suitable manner, but in the present case are shown provided by a lug 55 forming an integral part of the contactor 36 and bent forwardly therefrom to have cooperative engagement with the opposite sides of a stop or abutment 56 formed on the inner face of the front wall 10 of the housing at a location centrally between the rivets 32 which secure the resistance element to the housing.

With the construction described it will be appreciated that all of the parts of the housing including the operating shaft of the instrumentality are held properly assembled, entirely without the use of fastening means of any kind other than the collector 45. It will also be seen that the collector may serve the above described functions without in anywise interfering with the incorporation of a switch instrumentality in the housing at a location rearwardly of the resistance element and its cooperating contactor.

Figure 4:
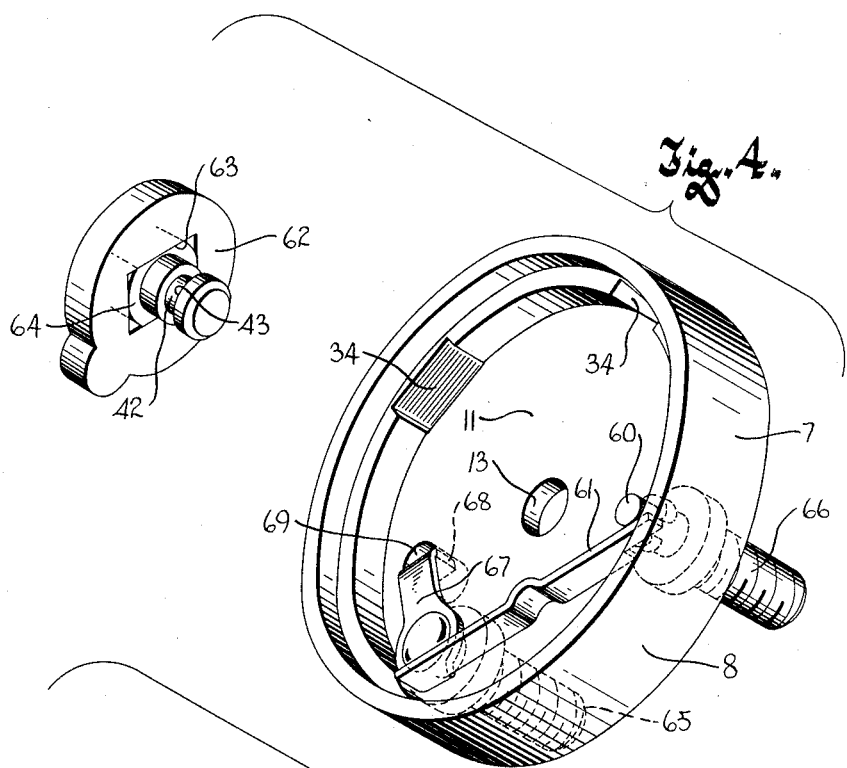
Figure 4 is a group perspective view illustrating the switch containing rear portion of the variable resistor, in disassembled relation.

As best seen in Figures 2 and 4 the electric switch comprises cooperating stationary and movable contacts 60 and 61, respectively, carried by the rear wall 11 of the housing adjacent to the inner face thereof, and a switch actuator 62 mounted on the rear portion of the operating shaft. The actuator 62 is in the form of a cam made of insulating material, and it has a non-circular aperture 63 to receive a similarly shaped non-circular driving portion 64 on the operating shaft just ahead of the rear wall 11 of the housing.

The switch also includes a pair of terminals 65 and 66 riveted to and projecting back from the rear wall 11 of the housing, at opposite sides of the collector 45. The terminal 66 has an inwardly projecting part that provides the stationary contact 60.

As shown best in Figure 4 the movable contact 61 comprises an elongated resilient contactor strip edgewise overlying the inner face of the rear wall 11 of the housing and having its free end adjacent to and cooperable with the stationary contact 60. The opposite end portion of the contactor has a mounting piece 67 bent therefrom to flatwise overlie the inner face of the rear wall 11, and the riveted connection between the terminal 65 and the wall 11 passes through the mounting piece 67 to firmly secure the contactor to the housing. A tab 68 on the outer end of the mounting piece is also bent rearwardly at right angles to the plane of the rear wall 11 and projects through a hole 69 therein to preclude rotation of the contactor about the axis of its terminal 65.

The switch is normally held open by the cam in one limit of rotation of the operating shaft, and it closes upon rotation of the shaft away from said limit of rotation.

Figures 1 through 5 illustrate but one application of the present invention, particularly to a so-called miniature variable resistor-electric switch combination suitable for use with hearing aids. The extreme degree of compactness achieved therein is portrayed in Figure 1, where the diameter of the instrumentality, with the actuating knob in place thereon, is shown to be smaller than that of a ten-cent coin. The elimination of the conventional collector ring interposed between the shaft and the resistance element, and the provision of a combination collector and retainer remote from the resistance element, materially help to make this degree of compactness possible.

Figures 6 through 11 illustrate how the principles of this invention can be utilized in a variable resistor which features compactness and simplicity, and which is especially valuable for use as a preset type of control.

In each of these embodiments of the invention the variable resistor comprises wall means 72 of insulating material providing spaced substantially parallel wall surfaces 73 and 74. Specifically, the wall means may be provided by a single disc of insulating material, or it may be a strip or panel of a rectangular shape as shown, capable of having a number of resistance elements mounted thereon in the open, that is, without any housing enclosing the operating parts thereof.

In each case also, an electrically conductive operating shaft 75 is rotatably carried by the wall means 72, as by the reception of a large diameter portion 76 of the shaft in a bearing hole 77 in the panel, and the shaft protrudes to opposite sides of the panel. In all of these embodiments except that shown in Figures 10 and 11, an annular enlargement 78 on the shaft acts as an abutment which engages the front surface 73 of the wall means to limit rearward motion of the shaft in relation thereto, and the shaft also has a circumferential groove in its rear end defining a collector contact having a forwardly facing contact surface 49 which provides an abutment facing the rear surface 74 of the wall means in spaced relation thereto.

In the embodiments of the invention shown in Figures 6, 7 and 8, the collector 80 is in the form of a spring strip, having a keyhole shaped opening in a medial portion thereof, and confined between the abutment or contact surface 49 on the shaft and the rear surface 74 of the wall means. Thus, the collector also urges the shaft rearwardly, to hold it properly assembled with the wall means, in a position defined by the engagement of the front abutment 78 on the shaft with the front surface of the wall means. The spring force of the collector in each case also provides a good electrical connection between the collector and a contactor 83 fixed on the front portion of the shaft, ahead of the surface 73 of the wall means, through the electrically conductive operating shaft.

The contactor 83 is substantially identical with that hereinbefore described except that its stop lug 55' is bent rearwardly from the contactor at an angle which diverges from the shaft axis. The contactor also overlies a resistance element 31 flatwise secured to the forwardly facing surface of the wall means 73 by the same rivets 32 which secure its terminal connectors 33 to the wall means. The terminals 33, however, have their longer legs protruding rearwardly through suitable slits in the wall means 72 and extending a distance beyond the rearwardly facing surface 74 of the wall means.

Rotation of the operating shaft 75 is arrested in the variable resistor shown in Figures 6 and 7 by the engagement of the lug 55' on the contactor with the forwardly protruding shank portion of a pin 85 loosely received in a hole 86 in the panel 72 substantially midway between the terminal rivets for the resistance element. This pin has an enlarged head 87 overlying the rearwardly facing surface 74 of the wall means and confined between it and the forward side of the collector. In this way the spring force of the collector is utilized to maintain the stop pin 85 against displacement from its hole in the wall means 72, and the head of the pin also tends to hold the collector in good electrical engagement with the contact surface 49 on the shaft carried collector contact.

It is also important to note that the end of the collector adjacent to the larger part of its keyhole opening has a short forwardly projecting hook 88 formed thereon and received in a notch 89 cut in the lower edge of the panel to prevent accidental displacement of the collector from its operative position. This hook snaps into place in the notch during downward assembling motion of the collector on the panel.

Since the variable resistors illustrated in Figures 6, 7 and 8 are intended for use as preset controls, the front ends of their operating shafts are preferably provided with a screw driver slot 90 to facilitate rotation thereof as desired.

In the embodiment of the invention illustrated in Figure 8, the variable resistor is the same as that described in Figure 6 with the exception that the stop pin 85 is eliminated, while an integral stop forming loop 85a is pressed into the collector adjacent to its terminal end, to extend forwardly through the hole 86 in the panel into the path of rotation of the lug 55' on the contactor 83. This construction is advantageous in that is eliminates one of the parts of the variable resistor. In this case, the hook on the lower end of the collector is eliminated, for its function is supplied by the engagement of the collector carried stop 85a in the hole 86 of the panel.

In the embodiment of the invention disclosed in Figure 9, the collector 80 differs in that its terminal end portion embraces the upper edge of the panel or insulating base, while its lower end terminates in bifurcations 91 which engage in the groove at the rear of the shaft and press rearwardly against the contact surface 49 on the shaft carried collector contact.

The terminal end portion of the collector is bent rearwardly and then forwardly back beyond itself to provide in effect a hairpin shaped terminal portion 53', the outer leg of which extends forwardly through a notch 92 in the upper edge of the panel or insulating base. The outer leg of the terminal is also bent downwardly or inwardly as at 93, flatwise over the forwardly facing surface 73 of the panel, so that the upper edge portion of the panel is tightly clamped between the inner end of the inner leg of the hairpin shaped terminal and the front extension 93 of the outer leg.

In this case, the collector carried stop 85b is formed on a rearward indentation 94 in the inner end of the terminal portion 93. The indentation, of course, engages in the hole 86 in the panel from the front thereof, to hold the collector against displacement out of its operative position.

In the embodiment of the invention shown in Figures 10 and 11, the resistance element is mounted on the rear surface of the panel or insulating base, and its L-shaped terminal connectors 33 likewise extend rearwardly from the panel. The contactor, in this case, may be fixed to the extreme rear end of the shaft for cooperation with the resistance element in the usual fashion. A circumferential enlargement 96 on the shaft near its front end, cooperates with the front of the panel to preclude rearward displacement of the shaft, and the front end portion of the shaft is reduced in diameter to define a forwardly facing contact surface 97 on the shaft. Hence, the enlargement 96 actually provides both the collector contact and a stop to limit motion of the shaft in a direction which would tend to reduce contact pressure between the contactor finger and the resistance element.

In this case, the collector 99 extends entirely across the front of the panel or insulating base, from top to bottom thereof, and it is held assembled with the panel by interlocking connections between its opposite end portions and the edge portions of the panel. For this purpose, the lower end portion of the collector has a rearwardly extending tab 100 thereon passing through a notch 101 in the panel, and lugs on the extremity of the tab extending from opposite side edges thereof engage over the rear of the panel to hold the lower end portion of the collector against pulling away from the panel. The upper end portion of the collector has a rearwardly bent tab 102 thereon which passes through a notch 103 in the edge of the panel and is kinked inwardly to engage over the rear face thereof, as at 104, to hold the upper end portion of the collector against pulling away from the panel. The collector terminal 105, of course, is formed integrally with the tab 103 and projects rearwardly from the panel, substantially medially between the terminals for the resistance element.

The reduced front end portion of the operating shaft projects through an opening 107 in the collector, and has a screw driver slot in its extremity to facilitate manual rotation of the shaft. The stationary stop 108 for the shaft is also formed as an integral part of the collector, being cut and bent rearwardly from the central portion of the collector in a manner which forms the opening 107 through which the front of the operating shaft projects. The stop 108, of course, passes rearwardly through a suitable hole 109 in the panel to lie in the path of rotation of the stop lug on the contactor.

The medial portion of the collector is preferably bowed rearwardly to engage the shaft carried collector contact 96 under spring tension so as to assure good contact pressure therebetween and at the same time exert sufficient rearward force on the circumferential enlargement which provides the collector contact as to inhibit forward axial motion of the operating shaft.

From the foregoing description taken together with the accompanying drawings it will be apparent to those skilled in the art that this invention provides a variable resistor featuring simplicity of construction and a high degree of compactness through the use of a spring strip which is relied upon to not only hold the parts of the variable resistor in properly assembled relation, but to also serve as a collector which may be located remote from the resistance element, to thereby achieve far greater flexibility in design than was hitherto possible.

What we claim as our invention is:

1. In a variable resistor: a housing having spaced front and rear walls of insulating material; a rotatable operating shaft of electrically conducting material; means journaling the shaft in the housing for rotation on an axis substantially normal to said front and rear walls and with the ends of the shaft protruding through said front and rear walls so as to be accessible for manual actuation from in front of the housing; arcuate resistance means disposed flatwise on the inner face of the front wall and closely encircling the shaft in spaced concentric relation thereto; a rotatable contactor fixed on the shaft to rotate therewith and in electrically conductive relation to the shaft, said contactor having a resilient finger engaging the exposed rear face of the resistance means; means providing a rearwardly facing abutment on the protruding front end portion of the shaft engaging the front wall of the housing to preclude rearward motion of the shaft and to hold the contact finger in pressure engagement with the resistance means; means formed directly on the protruding rear end portion of the shaft providing a concentric forwardly facing abutment thereon having a surface which is spaced rearwardly of the rear wall; and a spring strip confined between said rear wall and the forwardly facing abutment on the rear of the shaft and exerting a rearward force on said abutment so as to hold the shaft assembled with the housing, the abutment on the rear of the shaft providing a collector contact at all times electrically connected with the contactor through the shaft, and said spring strip serving as an electrically conductive collector for the variable resistor at all times engaged with the collector contact under spring force.

2. The variable resistor set forth in claim 1 wherein the housing comprises interfitting axially separable front and rear housing sections, and wherein the spring strip collector cooperates with the abutments on the shaft to exert opposing axial forces on the housing sections to hold the same together.

3. The variable resistor set forth in claim 2, further characterized by the provision of switch means in the housing, including cooperating stationary and movable contacts mounted on the inner face of the rear wall, and a switch actuator of insulating material fixed on the operating shaft to effect opening and closing of the switch in consequence of rotation of the shaft.

4. The variable resistor set forth in claim 1 wherein said spring strip extends transversely across the back of the rear wall and has a keyhole shaped opening in its center, the collector contact normally overlying and engaging the marginal edge portions of the smaller part of said opening but being capable of passage through the larger part of said opening upon shifting of the spring strip transversely in a direction to bring the larger part of its opening into coaxial relation with the shaft; and cooperating means on the collector and the housing to normally restrain the collector against such shifting.

5. In a variable resistor: a housing having spaced front and rear walls of insulating material; a rotatable operating shaft of electrically conducting material; means journaling the shaft in the housing for rotation on an axis substantially normal to said front and rear walls, and with the ends of the shaft protruding through said front and rear walls; a cup-like knob fixed to the protruding front end of the operating shaft, the skirt of the knob encircling the housing and having its edge adjacent to the rear wall so that the housing is substantially nested within the knob and the knob constitutes the largest part of the resistor; arcuate resistance means disposed flatwise on the inner face of the front wall and closely encircling the shaft in spaced concentric relation thereto; a rotatable contactor fixed on the shaft to rotate therewith and in electrically conductive relation to the shaft, said contactor having a resilient finger engaging the exposed rear face of the resistance means; means providing a rearwardly facing abutment on the protruding front end portion of the shaft engaging the front wall of the housing to preclude rearward motion of the shaft and to hold said resilient finger in pressure engagement with the resistance means; means formed directly on the protruding rear end portion of the shaft providing a concentric forwardly facing abutment thereon having a surface which is spaced rearwardly of the rear wall; a spring strip extending transversly across the rear of the housing with its end portions bearing against the rear wall of the housing and its medial portion bowed rearwardly from said wall and engaging said forwardly facing abutment so that said spring strip exerts rearward force on said abutment and holds the shaft assembled with the housing, the abutment on the rear of the shaft providing a collector contact at all times electrically connected with the contactor through the shaft, and said spring strip serving as an electrically conductive collector for the variable resistor at all times engaged with the collector contact under spring force; and terminals for the ends of the resistance means and for the collector projecting rearwardly from the rear wall of the housing and lying within the projected perimeter of the knob so that no part of the resistor extends radially beyond the perimeter of the knob.

References Cited in the file of this patent

UNITED STATES PATENTS

| | | |
|---|---|---|
| 1,519,621 | Kent | Dec. 16, 1924 |
| 2,309,798 | Stoekle et al. | Feb. 2, 1943 |
| 2,358,991 | Miller | Sept. 26, 1944 |
| 2,451,241 | Rosentretor | Oct. 12, 1948 |
| 2,576,044 | Richman et al. | Nov. 20, 1951 |